July 28, 1959    G. GARNIER    2,896,475
ACCESSORIES GEAR BOXES
Filed July 21, 1955    3 Sheets-Sheet 1

Georges Garnier
By
Attorney

July 28, 1959 G. GARNIER 2,896,475
ACCESSORIES GEAR BOXES
Filed July 21, 1955 3 Sheets-Sheet 3
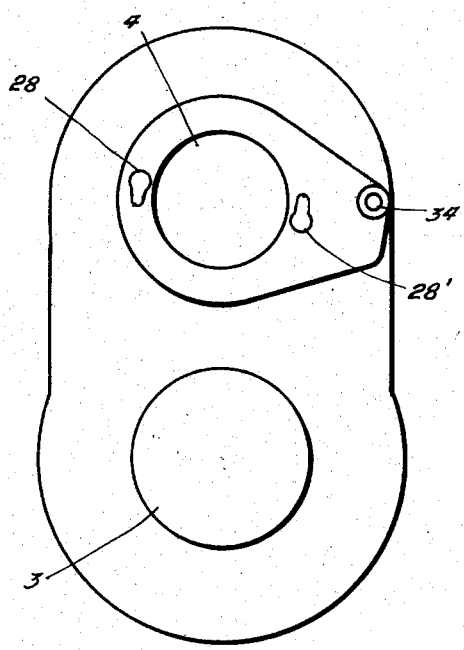
Fig. 3
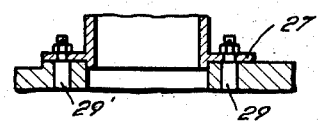
Fig. 5
Fig. 4
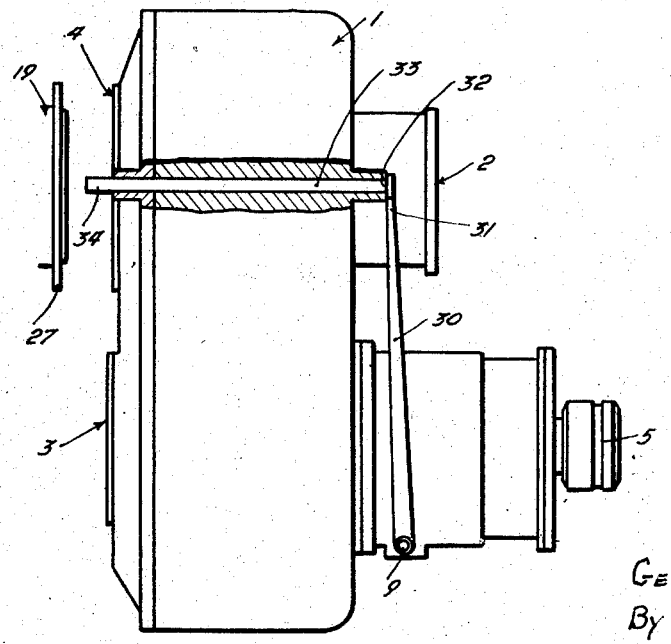
Georges Garnier
By
Attorney

ACCESSORIES GEAR BOXES

Georges Garnier, Asnieres, France, assignor to Air-Equipement, Asnieres, France, a French company Application July 21, 1955, Serial No. 523,409

Claims priority, application France July 27, 1954

2 Claims. (Cl. 74—665)

This invention relates to gear boxes fitted on aircrafts for the drive of accessories such as power plants for auxiliary services.

These gear boxes are positively driven by the aircraft engine or engines and the latter must therefore be running to drive, for instance, the electric generator or the hydraulic pump when tests are made on certain instruments of the aircraft on the ground.

One object of this invention is to provide a combination of means permitting of disengaging the drive of an accessory gear box from the aircraft engine or engines, and of driving the said gear box by means of an auxiliary shaft and of an engine independent of the aircraft, so as to obtain the necessary power for making certain tests on board without running the aircraft engine or engines.

To this end, said combination of means comprises, on the one hand, a clutch device, for instance of the dog-type, fitted on the gear box for the purpose of engaging or disengaging the drive of the aircraft engine, and on the other hand, a special auxiliary gear box, or ground power gear-box capable of being fitted on one of the power take offs remaining free on the accessory gear box and so as to be driven by an auxiliary or "ground" engine, for instance through a telescopic shaft and a universal joint.

It is advantageous for the clutch release device of said gear box to be automatically controlled by the "ground" auxiliary gear-box when fitted on the main gear box. In a particular embodiment, this automatic control is ensured by a sliding rod, one end of which projects out of the main gear box so as to be pushed back by flange of the auxiliary gear-box when the latter is fitted on the said gear box, and the other end of which drives a clutch control component by pressure, when the rod is pushed back, the said clutch control component being elastically released towards the clutch engagement position, thus causing the free end of the rod to project again when the ground or auxiliary gear-box is removed.

The auxiliary ground gear-box preferably comprises a quick connecting and disconnecting device which can advantageously be of the self-locking type.

Another object of the invention is to provide an accessories gear-box with a device for throwing the power take off into clutch with the aircraft engine or engines, on the one hand, and a removable auxiliary ground gear-box of the type described above, on the other hand.

Further objects and advantages of the present invention will be apparent from the following description, reference being had to the accompanying drawings wherein a preferred embodiment of the present invention is clearly shown in the drawings.

Fig. 3 is a view of the rear face of the main gear-box;

Fig. 4 is an external view of the same main gear-box, the auxiliary gear-box being removed;

Fig. 5 is a cross-section of the mounting flange of the auxiliary gear-box.

Figure 1:
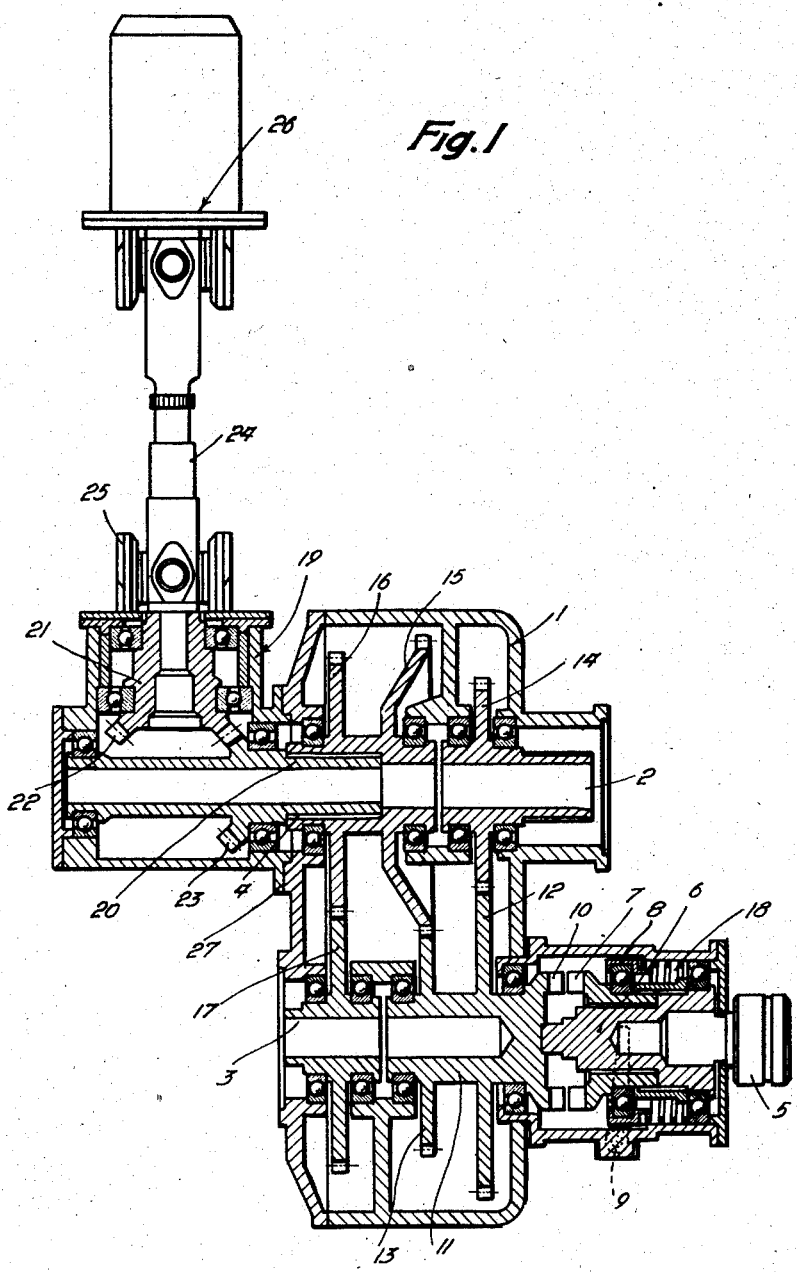
Fig. 1 is a cross-section of the main gear-box assembly with the auxiliary gear-box fitted on it.
Figure 2:
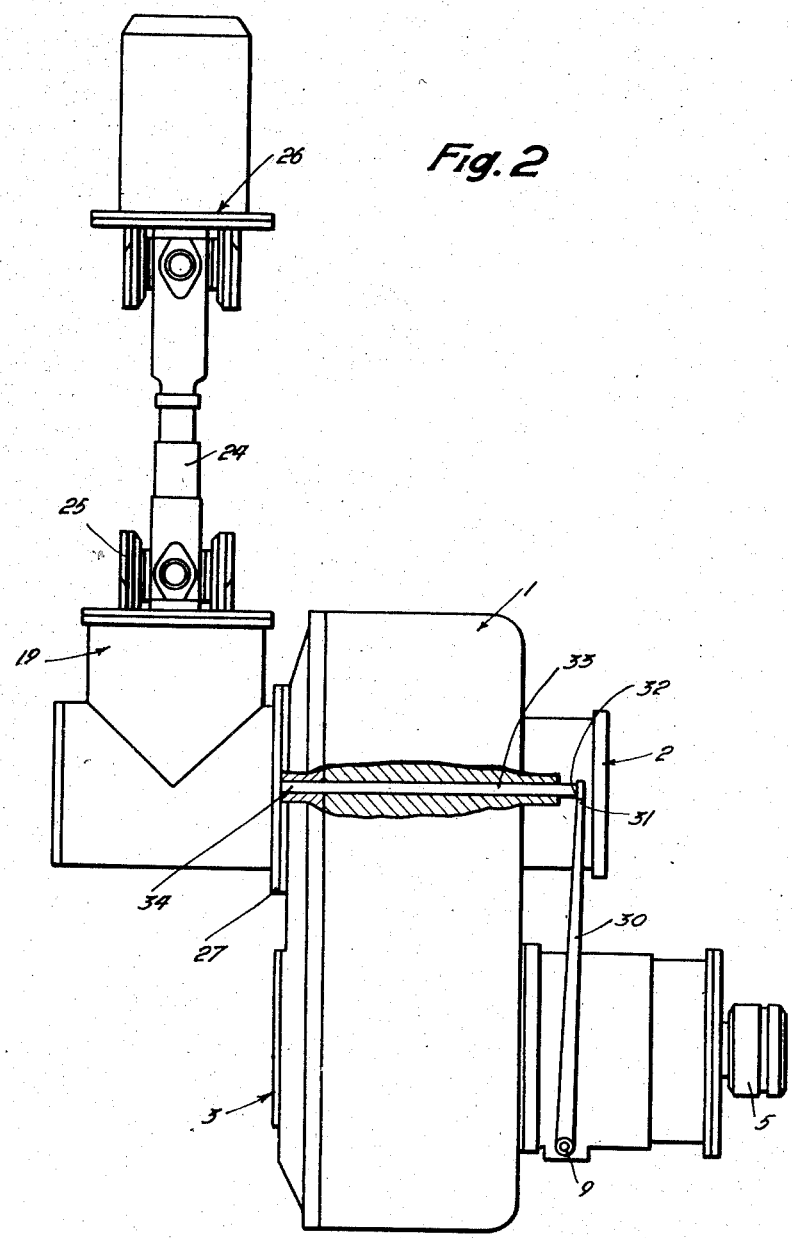
Fig. 2 is an external view corresponding to Fig. 1.

In the embodiment shown in Figs. 1 to 5, the accessory gear-box 1 comprises three power take offs 2, 3 and 4, the purpose of the two first take offs 2, 3 being to receive the accessories and the take off 4 being intended to receive the auxiliary "ground" gear-box, as will be hereinafter explained. On the aeroplane, the main gear-box is driven by a shaft connected to the engine and not shown, which actuates, through the universal joint 5, a splined shaft 6 on which is fitted a slide-mounted dog-clutch sleeve 7. The sliding motion of the said sleeve 7 results from the traverse motion of a clutch release bearing 8, the latter itself being driven by a swinging fork 9. The dogs 7 work in conjunction with the driving dogs 10 of the shaft 11 carrying the pinions 12, 13 which are meshed respectively with the pinion 14 driving the power take off 2 and with the pinion 15 integral with the power take off shaft 4; a second pinion 16 integral with the same shaft, ensures the drive of the power take off 3 through the engagement of pinion 17. A spring 18 constantly urges the bearing 8 towards the left, that is to say, towards the position where dogs 7 and 10 are in mesh, or clutch position.

The auxiliary ground gear-box 19 comprises an output splined shaft 20 which is adapted to mesh with the shaft 4 of the main gear box and an input shaft 21 at right angles with the shaft 20 which it drives through the bevel gears 22, 23. The auxiliary gear-box 19 is itself driven by a portable so-called "ground" engine, which is not shown, through the telescopic shaft 24, the universal joint 25 and the universal joint power take off 26.

To facilitate quick mounting and dismounting on the main gear box 1, the auxiliary gear-box 19 comprises a flange 27 provided with two studs 29, 29' adapted to pass through holes 28, 28' provided on the face of the gear box 1 on which is mounted the auxiliary gear-box 19, the said stud-holes being diametrically opposed in relation to the axis of the power take off 4.

The fork 9 of the clutch release bearing 8 is connected to a lever 30, the free end 31 of which is in contact with the end 32 of a rod 33 which is slide-mounted in the gear box 1. The other end 34 of this rod 33 projects out of the box 1 on the face on which the auxiliary gear-box is mounted.

The flange 27 of said auxiliary gear-box 19 acts as an abutment for the rod 33.

It results from the foregoing that when the auxiliary gear-box 19 is removed, the rod 33 is released and can slide towards the left (Fig. 2); the lever 30 and the fork 9 swivel in the same direction under the action of the spring 18 which pushes the clutch thrust bearing towards the left and causes the dogs 7 and 10 of the power take off of the aircraft engine to mesh automatically.

On the contrary, when the auxiliary gear-box 19 is mounted on the corresponding face of the gear-box 1, by inserting the head stops 29, 29' into the stud-holes 28, 28', the lever 30, connected to the fork 9 is pushed into the out-of-clutch position by the rod 33 which is itself pushed back by the flange 27 acting on the end 34 of the said rod. It is to be noted that the torque transmitted by the auxiliary engine ensures automatic locking of the stops 29 in the stud-holes 28. When the auxiliary gear-box 19 is mounted on the main gear-box 1, the auxiliary "ground" engine transmits its power, through shafts 21 and 20, to the shaft of the power take off 4 and from there to the shafts of the power take offs 3 and 2, through pinions 16 and 17, and through the pinions 15 and 13, the shaft 11 and the pinions 12, 14, respectively.

It goes without saying that the invention is in no way confined to the details of embodiment shown in the drawings or described, the said details being given merely by way of illustration. For instance, the dog-clutch could be replaced by a plate, hydraulic or any other type of clutch; and the clutch control could be non-automatic or of the hydraulic, cable type, etc.

What I claim is:

1. In combination, a gear-box for carrying and driving accessories on board aircraft including a casing, a plurality of gears supported by and enclosed within said casing and operatively connected together to be rotated at the same time, one of said gears being adapted to be operatively connected to an engine of said aircraft, a clutch device inside said casing of said first gear-box adapted to connect and disconnect said connectable gear to and from said aircraft engine, an auxiliary gear-box operatively connectable to an auxiliary engine other than an engine of said aircraft and including a casing mounted on said casing of said first gear-box for driving accessories and gears supported by and enclosed within said casing of said auxiliary gear-box, said last casing being adapted to be removed from said casing of said first gear-box for driving accessories and means for automatically putting said clutch device of said gear-box for carrying and driving accessories in its disconnecting position when said casing of said auxiliary gear-box is mounted on said casing of said gear-box for driving accessories and for automatically putting again said clutch device in its connecting position when said casing of said auxiliary gear-box is removed from said casing of said gear-box for driving accessories.

2. In combination, a gear-box for carrying and driving accessories on board aircraft including a casing, a plurality of gears supported by and enclosed within said casing and operatively connected together to be rotated at the same time, one of said gears being adapted to be operatively connected to an engine of said aircraft, said gear-box further comprising a clutch device inside said casing for connecting and disconnecting said connectable gear to and from said engine and a sliding rod having two ends, namely a free end and an end operatively connected to said clutch device so as to put said clutch device in its disconnecting position when said rod is sliding in one direction through a force exerted on said free end of said rod and elastic means for having said rod slide in the opposite direction when said force is no longer exerted on said free end whereby putting again said clutch device in its connecting position, and an auxiliary gear-box operatively connectable to an auxiliary engine other than an engine of said aircraft and including a casing mounted on said casing of said first gear-box and thus exerting a force on said free end of said rod so as to automatically put said clutch device in the position where said engine of said aircraft is disconnected and gears supported by and enclosed within said casing of said auxiliary gear-box, said last casing being adapted to be removed from said casing of said first gear-box and, when removed, to let said rod slide under the action of said elastic means in the direction for putting said clutch device in its connecting position said casing of said gear-box for driving accessories so that when said casing of said auxiliary gear-box is mounted on said casing of said gear-box for driving accessories a force is exerted on said free end of said rod so as to automatically put said clutch device in the position where said engine of said aircraft is disconnected.

References Cited in the file of this patent

UNITED STATES PATENTS

| | | |
|---|---|---|
| 2,195,139 | Waseige | Mar. 26, 1940 |
| 2,422,173 | Wilson | June 10, 1947 |
| 2,443,720 | Burrus | June 22, 1948 |